United States Patent [19]

Kelley

[11] 4,323,879
[45] Apr. 6, 1982

[54] BICYCLE SAFETY FLASHER WITH OPTIONAL MOUNTING MEANS FOR OTHER USES

[76] Inventor: Dale T. Kelley, 2329 N. 39th Pl., Phoenix, Ariz. 85060

[21] Appl. No.: 195,755

[22] Filed: Oct. 10, 1980

[51] Int. Cl.³ .............................. B60Q 1/30; B62J 5/00
[52] U.S. Cl. ...................................... 340/134; 340/84; 340/81 R; 340/87; 340/321; 362/72; 362/157; 339/193 P; 339/263 E
[58] Field of Search .................... 340/134, 84, 81, 87, 340/90, 114 R, 114 B, 321, 331, 340; 200/60; 315/200 A; 331/68; 362/72, 157, 171–173, 190, 191, 195, 196, 226, 362, 365; 339/65 R, 95 R, 95 MP, 225, 230 RL, 263 R, 263 E, 277 R, 193 P

[56] References Cited

U.S. PATENT DOCUMENTS 4,047,150  9/1977  Kelley ................................. 340/84

Primary Examiner—John W. Caldwell, Sr.
Assistant Examiner—Donnie L. Crosland
Attorney, Agent, or Firm—Oltman and Flynn

[57] ABSTRACT

A safety flasher to be mounted on a bicycle, or alternatively to be worn by a person. Its purpose is to increase one's visibility at night. It features a simple assembly and closing means in which a pair of screws hold major components in location and also complete the electrical circuit between the control and the signal lamp.

8 Claims, 7 Drawing Figures

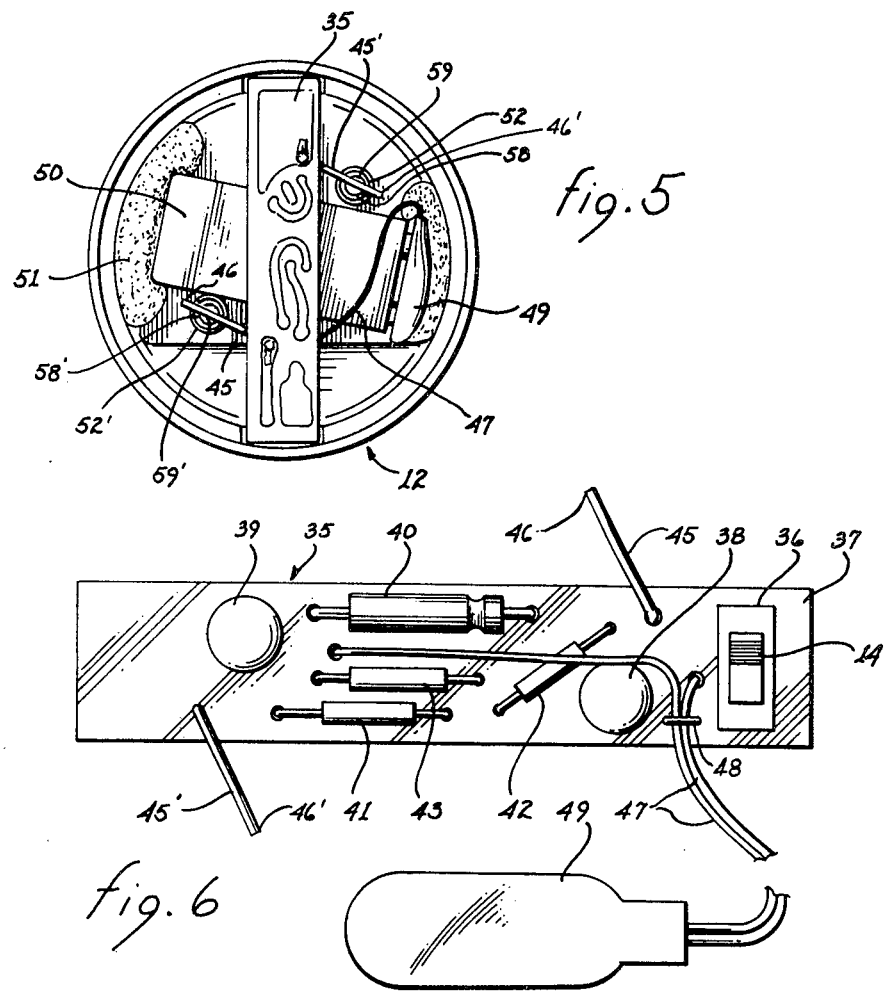
fig. 5
fig. 6
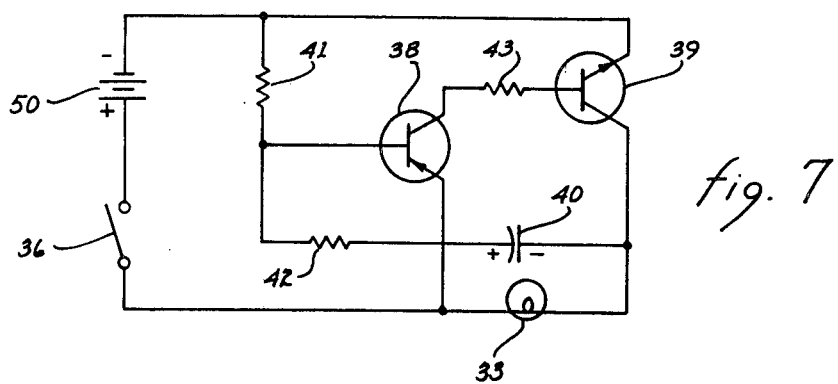
fig. 7

BICYCLE SAFETY FLASHER WITH OPTIONAL MOUNTING MEANS FOR OTHER USES

RELATED INVENTION

This invention is an improvement of that described in U.S. Pat. No. 4,047,150 of the present inventor.

BACKGROUND OF THE INVENTION

It is well known that safety flashers are effective warning devices at night and so have been adapted for aircraft, emergency vehicles, and highway and construction barricades to mention a few uses. When mounted on a bicycle or on one's person, they offer considerable added protection to the user against being hit by an automobile as they are much more apt to get the driver's attention than are ordinary continuous lights or simple reflectors.

Flashers of the barricade type are now available with adapters for bicycle mounting, and while these are very worthwhile devices from a visibility standpoint, they are heavy, large and cumbersome as well. They are also unsuited for hiking or walking use. Their size and weight makes them less popular with serious cyclists than they might otherwise be since such cyclists prefer very light weight and portable equipment. Barricade flashers are also fairly expensive which tends to reduce their salability and therefore their use is also limited.

A good lightweight flasher should find ready acceptance among cyclists and other non-motorists using streets and roads at night provided such devices are very inexpensive. As a consequence, night accidents involving cyclists and others should be substantially reduced.

SUMMARY OF THE INVENTION

Most flashers using incandescent lamps will fall into one of two classifications which are (1) those having a bi-metallic element to flash them off and on as the element heats and cools and (2) those which have a solid state electronic circuit to control the flashing. The first type is characterized by poor battery life but the initial cost is typically very low as the control is inexpensive. The second type using the solid state circuit may be made to give exceptionally long battery life even with a very bright flash and a small battery. This present invention is of the second type and has been designed with a number of cost saving features so that it may be retailed reasonably competitively with the bi-metallic type or "blinkers" as they are generically known.

To reduce manufacturing costs, secondary wiring steps have been avoided and instead circuit assembly on a printed circuit board has been made as complete as practicable. Attached to the board is an on-off switch, the electronic control for the flasher, the battery terminal snap, and the terminations to power the lamp. Screws used to close the battery case with the reflector assembly also complete the connections of the flasher in lieu of secondary wiring as will be shown in the descriptive material to follow. A fresnel type lens snaps onto the reflector to complete the unit. Lightweight plastics are used where possible to keep the weight down.

A signal type incandescent lamp is controlled by a transistor circuit for frequency and duration of flash. A miniature transistor radio size battery provides the power.

The principal object of the invention is to provide a very low cost flasher without sacrificing desirable features such as long battery life and a bright flash.

The secondary object is to provide a flasher that is highly effective, small, lightweight, and durable.

An additional object is to provide multiple mounting means including a stand-up base so the flasher may be used in a number of ways.

Another object is to minimize assembly steps.

The accompanying drawings form a part of this specification and are referred to throughout the description to follow.

FIG. 5 is a view of the battery case from the top with battery and printed circuit board in position.

FIG. 6 is the printed circuit board showing the various components and the pair of solid wire terminations used to make electrical contact to the signal lamp.

FIG. 7 is the circuit schematic of the principal embodiment.

DETAILED DESCRIPTION

Figure 1:
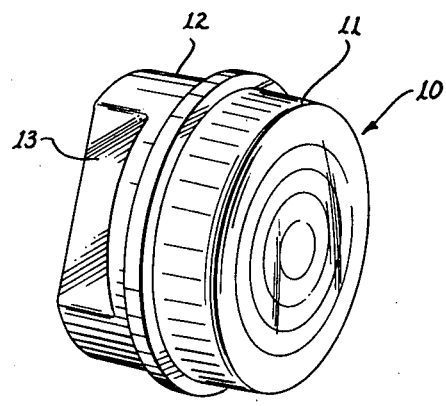
FIG. 1 is a perspective view of the flasher showing the lens and the side of the case having a step portion to accommodate a switch.
Figure 2:
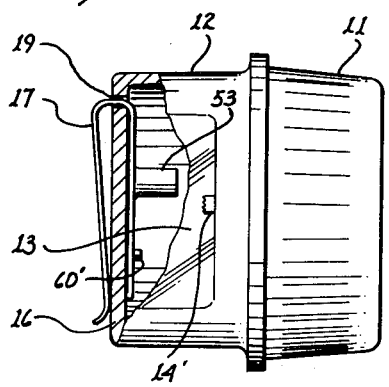
FIG. 2 is a side view of the flasher with a portion cut away to show how an optional belt clip may be attached (the belt clip is not a part of the principal embodiment but is shown in FIGS. 2, 3, 4, and 5 to reduce the number of specification drawings required).
Figure 3:
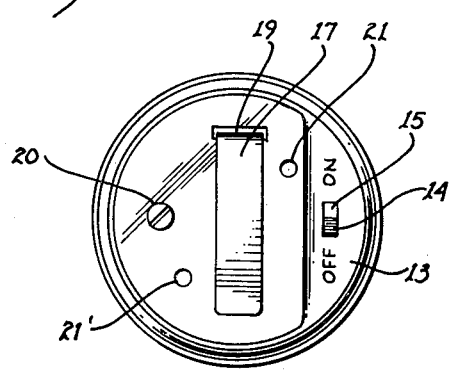
FIG. 3 is a rear view of the flasher, showing the mounting holes for bicycle attachment, and the on-off switch.

Referring now to FIGS. 1 through 5 principally, the exterior of the flasher 10 is shown in perspective in FIG. 1. The unit has a fresnel type amber lens 11 of acrylic or polycarbonate plastic, and a battery case 12 of ABS or polycarbonate plastic. A step 13 has been molded into the side of the battery case so that the switch toggle 14 is readily accessible through the toggle opening 15 to turn the flasher on or off. The cut away portion shows how the optional spectacle case type belt clip 17 may be located and held without the use of cements or fasteners. A slot 19 is provided in the plastic case in which the flat leaf which is the rear leaf of the clip 17 is pushed through so that it lies between small studs 60 and 60' thereby locating it. The rather abrupt rise or sharp radius of curvature at the portion joining the two leafs of the clip prevent removal of the clip by forces directed along the centerline of the clip. Spring pressure between the front or outside leaf and the back leaf keeps the clip between the studs 60 and 60' and fixed in position. The spring clip is easily removed by simply lifting the back leaf near the end and pushing firmly forward on it toward the slot.

Almost any method of preventing the back leaf from shifting laterally, i.e., from side to side may be substituted for the two studs as locators. For example, a locating channel or groove may be molded into the plastic to replace the studs, or two studs may be replaced by a single stud and a hole slot or notch stamped into the back leaf so that when the hole or notch is placed over the stud the leaf is prevented from having lateral movement. To minimize movement of the clip, the slot 19 should be roughly the width and thickness of the clip although it can be substantially larger in the direction of the thickness at the bend without detrimental effect.

At the back of the flasher (FIG. 3) are two holes 21 and 21' used in mounting the unit to a bicycle fender, or a bike bag, or bike pannier using self tapping screws with washers (not shown). Alternatively, the flat head screw 20 which threads into the boss 53 may be used to mount the unit to the bicycle. In both cases the spring clip 17 although shown is not in place for bicycle mounting in this manner.

Since the flasher was designed for bicycle mounting, with mounting screws at the rear, changing batteries is accomplished by removal of the front of the unit rather than opening up the rear. The lens is easily removed by twisting a dime or screwdriver in a space (not shown) between the lens 11 and the reflector 25 exposing a pair of screws 24 and 24' which when removed expose the circuit 35 and battery 50 which are lifted out together to change the battery.

Figure 4:
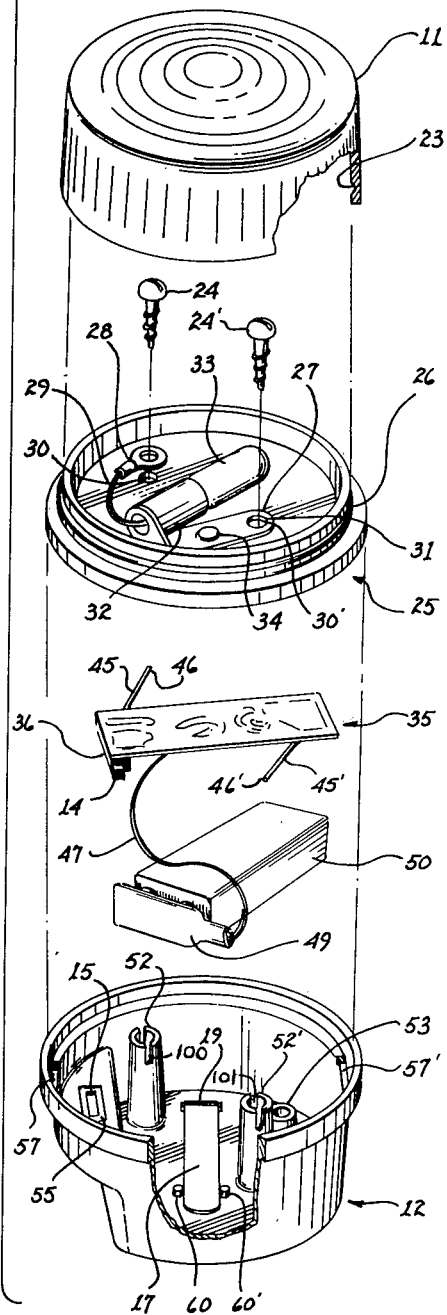
FIG. 4 is an exploded view of the flasher, showing the relative stacking of the major components when the flasher is put together as in changing a battery.

The factory finished unit consists of the loose major parts shown in FIG. 4 less battery and without the belt clip. These major parts are the lens 11, the reflector assembly 25, the circuit board 35, the battery case 12 and self tapping screws 24 and 24'. The lamp holder is part of the reflector assembly, and is fastened to it with the upset plastic stud 34 thru a hole (not shown) in the bracket.

The wire staple 48 which is clinched to the circuit board and anchors the insulated battery wires 47 is coated with a heat resistant material or plastic such as "Teflon" for accommodating wave or dip soldering. The Teflon or polytetrafluroethylene slows heat transfer at the staple during soldering and prevents the hot staple from melting thru or otherwise damaging the insulation of the battery wires 47. Alternatively, the battery wires 47 may themselves be coated with a heat resistant plastic to prevent soldering damage, or a heat resistant plastic staple may be used.

To install the battery, the battery snap 49 is "snapped on" the 9 volt battery 50 which may be of the zinc-carbon, alkaline, or mercury type. The wires 47 connect the printed circuit board to the battery. The battery is placed between the bosses 52 and 52' and held by pressure from a urethane sponge 51 (see also FIG. 5) at the end of the battery. The circuit board 35 is then placed into the nesting regions 57 and 57' which locate the board so that the toggle 14 is in position in the opening 15 (clearance for the switch is provided by the recess 55), and the terminations 46 and 46' of the wires 45 and 45' fit into the slots 100 and 101 at the tops of the counterbored holes 58 and 58' of the bosses 52 and 52'. At the initial assembly of the device, these terminations are substantially straight and approximately parallel in this embodiment until the assembly screws 24 and 24' are inserted (as will be described) which bends them along a small portion as they are squeezed between the screw and the walls of the counterbored and slotted bosses 52 and 53.

The smaller holes 59 and 59' concentric with the counterbores are the holes into which the screws 24 and 24' (FIG. 4) are threaded. Before using the screws, the reflector assembly 25 is placed on the battery case 12 so that the holes 30 and 30' of the reflector lie over those holes in the top of the bosses 52 and 52'. The screws 24 and 24' are then placed thru the holes of the terminal 38 and terminal bracket 27 of the lamp holder 32, then through the holes 30 and 30' of the reflector and into the holes 59 and 59' (FIG. 5) of the battery case and then tightened. The terminals 28 and 34 provide electrical contact through the wire 29 and the bracket itself for the incandescent signal lamp 33. The slots 100 and 101 which intersect the surfaces of the counterbores 58 and 58' are parallel to each other in this embodiment and of such an orientation that the terminations 46 and 46' of the wires 45 and 45' fit easily therein and make electrical contact with the screws thereby completing the electrical connection between the printed circuit board and the signal lamp. With slots and wires parallel to one another, alignment for assembly is also facilitated.

Wires 45 and 45' do not have to be pre-bent or otherwise preformed near the terminations 46 and 46' to fit the bosses 52 and 53 as was described and shown in U.S. Pat. No. 4,047,150. This feature eliminates preforming and related assembly steps and the product is improved by the better electrical connection as described below.

At assembly, the wires are pushed aside by the screws 24 and 24' and against the walls of the counterbores 58 and 58' distorting the walls slightly outward. The counterbores are of a sufficiently large diameter as to prevent the soft copper wires from being cut in two by the sharp threads of the self tapping screws but small enough so that the threads cut slightly into the wire. The wires near the terminations are squeezed by this action into small semicircles (not shown) within the bosses and about a portion of each screw. The resulting pressure against each screw by the wire from its normal springback and from the slightly distorted counterbore wall makes a very tight and reliable connection. In addition, when the screws are seated, the wires are absolutely trapped in position within the slots by the back of the reflector 25 which is held tightly against the tops of the slotted bosses 52 and 53 closing the slots, thus further improving the reliability of the electrical connections.

The electronic components are arranged on a thin circuit board as shown in FIG. 6. In the preferred embodiment there is the board 37 on which is mounted the switch 36, a PNP transistor 38 such as an 2N3638, an NPN transistor 39 such as a 2N3641, a capacitor 40 of 3 uF ±5%, a frequency timing resistor 41 of 470K ohms ±5%, a duration timing resistor 42 of 680 ohms ±5% which determines the length of time the lamp remains on, and the base resistor 43 of 300 ohms. The solid wire 45' is connected on the board to the collector of the NPN transistor and the solid wire 45 is connected to the + side of the battery through the switch 36. The arrangement is shown more clearly in the schematic FIG. 7, which is the circuit used. The lamp 33 is a #1850 signal type.

Lens, reflector and battery case are injected molded parts and are very inexpensive. Factory assembly costs are largely those of producing the electronic circuit and packing the various major parts. Circuits may be dip or wave soldered at very lost cost, and packing costs are only a small percentage of the circuit cost. The result is a flasher that completely meets the stated principle objective of low cost.

The device weighs 3½ ounces with battery and is of high impact plastic. The size is 3" by just over 2" in depth. It is exceptionally bright as the 5 volt #1850 lamp is operated by the 9 volt battery delivering 7 to 8 volts under lamp load. There is some sacrifice in lamp life but typically lamps operate in the flashing mode under these conditions for hundreds of hours which is more than adequate for a device of this type. The flasher may be mounted and therefore used in a variety of ways, and will rest upright on the switch step and the rim of the case to face traffic for emergency use when making bicycle repairs on the road for example.

Having thus described my invention, I claim:

1. In a safety flasher having a battery case with two inwardly projecting bosses between which a battery is received, each of said bosses having an axial opening therein which is open at the inner end of said boss, a lens closing said battery case, a circuit board providing a flasher circuit, a reflector assembly carrying a lamp with terminals for shining light through said lens, and fasteners for fastening said reflector assembly to said bosses, the improvement wherein:

said bosses have transverse slots therein which intersect said axial openings and are open at the inner ends and at the opposite sides of the respective bosses;

said circuit board has wire terminations seated in said transverse slots and extending across said axial openings in the respective bosses;

and said fasteners extend into said axial openings in the bosses and contact said wire terminations seated in said transverse slots in the bosses, said fasteners also contacting said lamp terminals for completing electrical connections between said circuit board and said lamp.

2. A safety flasher according to claim 1, wherein said reflector assembly extends closely across the inner ends of said bosses and traps said wire terminations in said transverse slots.

3. A safety flasher according to claim 1, wherein said fasteners are screws which squeeze said wire terminations laterally against the inside of said bosses at said axial openings therein.

4. A safety flasher according to claim 3, wherein said reflector assembly extends closely across the inner ends of said bosses and traps said wire terminations in said transverse slots.

5. A safety flasher according to claim 3, wherein said wire terminations extend substantially straight across said axial openings in the bosses between said transverse slots in the bosses prior to their engagement by said screws.

6. A safety flasher according to claim 1, wherein said wire terminations extend substantially parallel to each other, and said transverse slots in the respective bosses extend substantially parallel to each other to facilitate the insertion of said wire terminations therein.

7. A safety flasher according to claim 6, wherein said reflector assembly extends closely across the inner ends of said bosses and traps said wire terminations in said transverse slots 8. A safety flasher according to claim 7, wherein said fasteners are screws which squeeze said wire terminations laterally against the inside of said bosses at said axial openings therein.

* * * * *